L. Leigh.
Globe-Valve.

N° 72868.      Patented Dec. 31, 1867.

Attest;
Chas. H. Smith
Geo. D. Walker

Lewis Leigh
per L. W. Serrell
Atty.

United States Patent Office.

LEWIS LEIGH, OF BRIDGEPORT, CONNECTICUT.

Letters Patent No. 72,868, dated December 31, 1867.

IMPROVEMENT IN GLOBE-VALVES.

*The Schedule referred to in these Letters Patent and making part of the same.*

TO ALL WHOM IT MAY CONCERN:

Be it known that I, LEWIS LEIGH, of Bridgeport, in the State of Connecticut, have invented, made, and applied to use a certain new and useful Improvement in Globe-Valves; and I do hereby declare the following to be a full, clear, and exact description of the said invention, reference being had to the annexed drawing, making part of this specification, wherein—

Similar marks of reference denote the same parts.

Heretofore globe-valves have been made with a screw that acts upon the valve itself, and this is generally moved by a wheel. In practice it is found that the movement of the pipe, from vibration of the engine or other machinery, is apt to cause the screw to turn, and either open or partially close the valve, thus varying the quantity of steam or water allowed to pass through the valve-seat.

Figure 1:
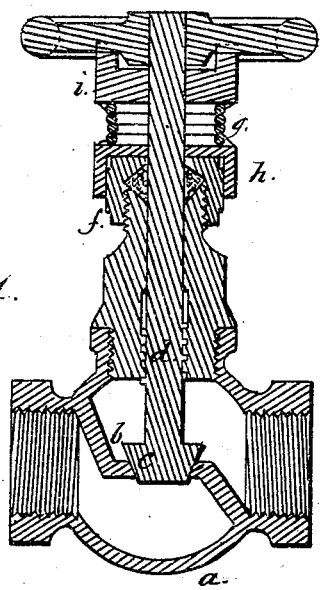
Figure 1 is a vertical section of a globe-valve with my improved attachment.
Figure 2:
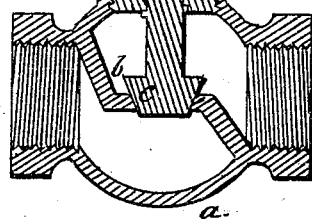
Figure 2 is a view of the end of the spring friction-clamp.
Figure 3:
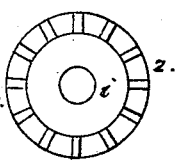
Figure 3 is an inverted plan of the socket on the spring, taking the polygonal stumping-box.

My invention is to obviate the before-mentioned difficulty, and consists in a spring friction-clamp, applied to the wheel of the valve in such a manner as not to interfere with the turning of said wheel by hand in either direction, but to prevent the turning of said wheel and its screw by accident or vibration In the drawing, $a$ is the globe or case of the valve, provided with couplings for connection to a pipe, and with a diaphragm in the interior, in which is the seat $b$ for the valve $c$. $d$ is the spindle and screw, $e$ the wheel by which the spindle is turned, and $f$ the stuffing-box cap, all made in any usual manner, and of the desired size. $g$ is a spring, surrounding the spindle $d$, between the stuffing-box $f$ and hand-wheel $e$; and attached to one end of said spring $g$ is a socket, $h$, with a polygonal recess corresponding to and setting over the polygonal exterior surface of the stuffing-box cap $f$, so that the spring cannot be turned around, and at the other end the spiral or helical spring $g$ is provided with a friction-clamp $i$, having a recessed surface to receive the hub of the wheel $e$, and with an undulating rim around said recess, as at 2, (see fig. 2,) that corresponds with the arms of the wheel $e$. This clamp $i$ is also attached to the spring $g$ so that it will not turn around, but by its undulating rim hold the wheel $e$ from turning accidentally, or by a jar; but at the same time the undulations are sufficiently small to allow the wheel $e$ to be turned by hand, the spring yielding as the arms pass over the undulations, and also causing the clamp to remain in contact with the wheel, whether that be screwed in or out with the spindle and valve.

What I claim, and desire to secure by Letters Patent, is—

The spring $g$, with the socket $h$ and clamp $i$ applied around the valve-stem between the stuffing-box and the hand-wheel, as and for the purposes set forth.

In witness whereof, I have hereunto set my signature, this 23d day of September, A. D. 1867.

LEWIS LEIGH.

Witnesses:
HENRY GARDNER,
GEO. W. WARNER.